United States Patent
Yang

(10) Patent No.: US 8,972,210 B2
(45) Date of Patent: Mar. 3, 2015

(54) POWER MANAGEMENT MODULE AND POWER SUPPLY APPARATUS

(75) Inventor: Abel Yang, Luzhou (TW)

(73) Assignee: Phoenix Technologies Ltd., Campbell, CA (US)

( * ) Notice: Subject to any disclaimer, the term of this patent is extended or adjusted under 35 U.S.C. 154(b) by 550 days.

(21) Appl. No.: 13/026,626

(22) Filed: Feb. 14, 2011

(65) Prior Publication Data
US 2012/0143534 A1    Jun. 7, 2012

(30) Foreign Application Priority Data
Dec. 3, 2010 (TW) ................................ 99142213 A

(51) Int. Cl.
*G01R 21/00* (2006.01)
*G01R 21/06* (2006.01)
*H02M 1/00* (2006.01)

(52) U.S. Cl.
CPC ........................................ *H02M 1/00* (2013.01)
USPC ............................................ 702/60; 702/62

(58) Field of Classification Search
USPC .......... 702/60, 57, 61–65, 182; 320/127, 128, 320/134, 137, 148, 149, 150; 324/416, 415, 324/433, 426
See application file for complete search history.

(56) References Cited

U.S. PATENT DOCUMENTS

| | | | |
|---|---|---|---|
| 7,211,987 B2* | 5/2007 | Aoki et al | 320/134 |
| 8,175,825 B2* | 5/2012 | Verdun | 702/62 |
| 8,350,533 B2* | 1/2013 | Tam et al. | 320/150 |
| 2006/0080051 A1* | 4/2006 | Breen et al. | 702/60 |
| 2011/0047396 A1* | 2/2011 | Kawamoto et al. | 713/322 |
| 2011/0154066 A1 | 6/2011 | Ravichandran et al. | |
| 2011/0154074 A1 | 6/2011 | Chen | |
| 2011/0157939 A1 | 6/2011 | Wang et al. | |
| 2011/0158142 A1 | 6/2011 | Gong et al. | |
| 2011/0161683 A1 | 6/2011 | Zou et al. | |
| 2011/0161707 A1 | 6/2011 | Blackburn et al. | |

* cited by examiner

*Primary Examiner* — Sujoy Kundu
*Assistant Examiner* — Ricky Ngon
(74) *Attorney, Agent, or Firm* — Brokaw Patent Law PC; Christopher J. Brokaw

(57) ABSTRACT

A power management module electrically coupled between an AC/DC switching power supply and an electronic apparatus comprises a memory device, voltage and current detecting units, a writing unit, and an alarm signal generation unit. The memory device generates an output data to the electronic apparatus. The voltage and current detecting units detect voltages and currents of the output terminals of the switching power supply, respectively. The writing unit writes a new input data and the voltage and current data to the memory. The alarm signal generation unit generates an alarm signal to the electronic apparatus according to the data stored in the memory device and according to the operation condition of the switching power supply.

18 Claims, 10 Drawing Sheets

|  | address | data |
|---|---|---|
| the first data field | 0 | XXX |
| the second data field | 1 | 240W |
| the third data field | 2 | 12V |
| the fourth data field | 3 | 5A |
| the fifth data field | 4 | 5V |
| the sixth data field | 5 | 3A |
| the seventh data field | 6 | 12.2V |
| the eighth data field | 7 | 4A |
| the nineth data field | 8 | 4.5V |
| the tenth data field | 9 | 2A |
| the eleventh data field | 10 | 125 degree |
| the twelveth data field | 11 | 90V |
| the thirteenth data field | 12 | 230W |

FIG. 6

POWER MANAGEMENT MODULE AND POWER SUPPLY APPARATUS

CLAIM OF PRIORITY

This application claims priority under 35 U.S.C. §119 to Taiwanese Patent Application No. 099142213, filed Dec. 3, 2010, entitled "Power Management Module and Power Supply Apparatus," invented by Abel Yang, the disclosure of which is incorporated by reference as if fully set forth herein.

BACKGROUND OF THE INVENTION

1. Field of the Invention

The present invention relates to a power management module, which is electrically connected between an AC/DC switching power supply and an electronic device.

2. Description of the Related Art

Data processing systems are systems that perform manipulation, signal processing, and data storage operations. Personal computer systems and their associated subsystems are two main units constituting data processing systems. A personal computer system can usually be classified as a desktop computer system or a portable computer system. A typical portable computer system includes a system unit having a system processor with associated volatile and non-volatile memory, a display monitor, a keyboard, one or more drives, and a mass storage device.

In addition, a personal computer system typically includes a power supply which receives commercial alternating current (AC) power, converts the AC power down to a smaller direct current (DC) voltage, and supplies the DC voltage to the various components of the computer system. FIG. 1 is a view for explaining a power supply 14 for a desktop computer system 10. The portable computer system 10 is connected by line 12 to the power supply 14. The power supply 14 has a plug 16 which engages an AC external power source outlet 18. In general, the power supply 14 receives the commercial AC power supply of 110V or 220V, converts the AC power supply into multiple DC voltages including 12V, 5V and 3.3V, and supplies the DC voltages to the various components inside or outside the desktop computer system 10. For example, the 12V DC voltage is used to drive a processor, a system board, a display card, or fans, the 5V DC voltage is provided to peripheral devices of the desktop computer system 10, such as a computer mouse or a keyboard, and the 3.3V DC voltage is used to drive a system board, PCI card, a sound card and a network card.

FIG. 2 is a view for explaining a power supply for a portable computer system 20. The portable computer system 20 is connected by line 22 to the power supply (hereinafter referred to as an AC/DC adaptor 24). The AC/DC adaptor 24 has a plug 26 which engages an AC external power source outlet 28. If the portable computer system 20 uses a thin film transistor liquid crystal display (TFT-LCD) 202, a DC voltage of 14V is usually required. Therefore, the AC/DC adaptor 24 receives the commercial AC power supply of 110V or 220V, converts the AC power supply into a DC voltage of 14V, and supplies the DC voltage to the portable computer system 20.

However, the configuration of the prior art power supply and the adaptor is designed to provide constant voltage and current to the personal computer systems or platforms, and the personal computer systems or platforms cannot obtain the operation conditions of the power supply or the adaptor, such as a margin of the rest power that the power supply can support. Therefore, if the number of peripheral devices connected to the personal computer system increases, the power supply may not be burdened with additional output power. Furthermore, if the system changes the operation mode, for example, the system enters a turbo mode from a normal mode, the temperature of the power supply may increase rapidly due to the excessive power consumption, which causes abnormal output voltage or current. Therefore, there is a need to provide a power management module so as to efficiently use the power provided by the power supply.

SUMMARY OF THE INVENTION

In accordance with one aspect of the invention, a power management module comprises a memory device, voltage and current detecting units, a writing unit, and an alarm signal generation unit. The memory device generates an output data to the electronic device. The voltage detecting unit detects a voltage value of at least one output terminal of the switching power supply and generates at least one voltage signal. The current detecting unit detects a current value of the at least one output terminal of the switching power supply and generates at least one current signal. The writing unit receives an input data, the voltage signal from the voltage detecting unit, and the current signal from the current detecting unit, and writes the input data, the voltage signal, and the current signal to the memory device. The alarm signal generation unit provides an alarm signal to the electronic device according to the data in the memory device written by the writing unit and according to the operation condition of the AC/DC switching power supply.

In accordance with another aspect of the present invention, a power supply apparatus comprises an AC/DC switching power supply and a power management module electrically connected to the AC/DC switching power supply. The power management module comprises a memory device, voltage and current detecting units, a writing unit, and an alarm signal generation unit. The memory device generates an output data to the electronic device. The voltage detecting unit detects a voltage value of at least one output terminal of the switching power supply and generates at least one voltage signal. The current detecting unit detects a current value of the at least one output terminal of the switching power supply and generates at least one current signal. The writing unit receives an input data, the voltage signal from the voltage detecting unit, and the current signal from the current detecting unit, and writes the input data, the voltage signal, and the current signal to the memory device. The alarm signal generation unit provides an alarm signal to the electronic device according to the data in the memory device written by the writing unit and according to the operation condition of the AC/DC switching power supply.

The foregoing has outlined rather broadly the features and technical advantages of the present invention so that the detailed description that follows can be better understood. Additional features and advantages of the present invention will be described hereinafter, and form the subject of the claims. Those skilled in the art will understand that the concept and specific embodiment disclosed herein can be readily utilized as a basis for modifying or designing other structures or processes for carrying out the same functions, and that such equivalent constructions do not depart from the spirit and scope of the invention as set forth in the appended claims.

BRIEF DESCRIPTION OF THE DRAWINGS

The accompanying drawings, which are incorporated in and constitute to a part of this specification, illustrate embodiments of the invention and, together with the description, serve to explain the principles of the invention.

FIG. 6 illustrates data formats of the data fields in accordance with one embodiment of the invention;

DETAILED DESCRIPTION

Embodiments of the invention may provide a power management module electrically connected between an AC/DC switching power supply and an electronic device. Other embodiments may provide a power supply apparatus for providing power to an electronic device.

In certain embodiments, a power management module and a power supply apparatus are disclosed. Detailed operation and compositions are described below in order that embodiments of the invention can be thoroughly understood. The embodiments of the invention do not limit the details, with which persons skilled in the field of power management module and power supply apparatus should be familiar. On the other hand, well known compositions and operation are not described in detail to avoid unnecessary limitations of the invention. Preferred embodiments are described in detail as follows. In addition to these detailed descriptions, this invention can also be implemented widely in other embodiments. In addition, the scope of the present invention is not to be taken in a limiting sense, and is defined only by the appended claims.

Figure 1:
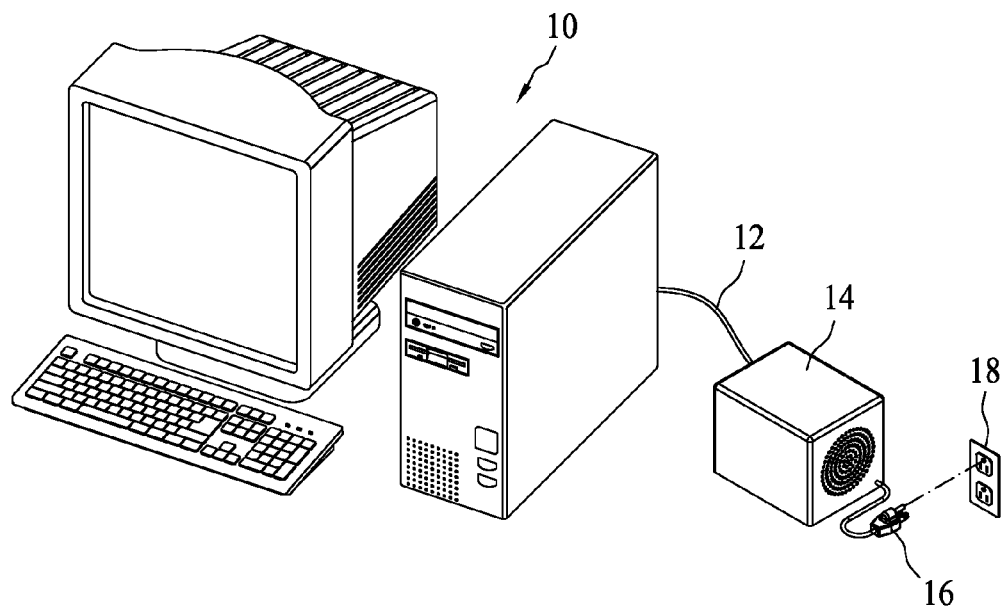
FIG. 1 is a view for explaining a power supply for a desktop computer system.
Figure 2:
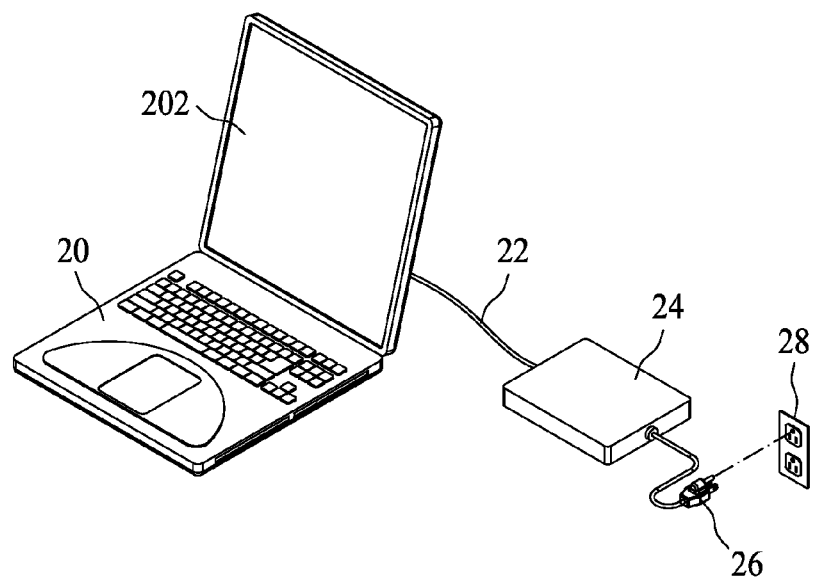
FIG. 2 is a view for explaining a power supply for a portable computer system.
Figure 3:
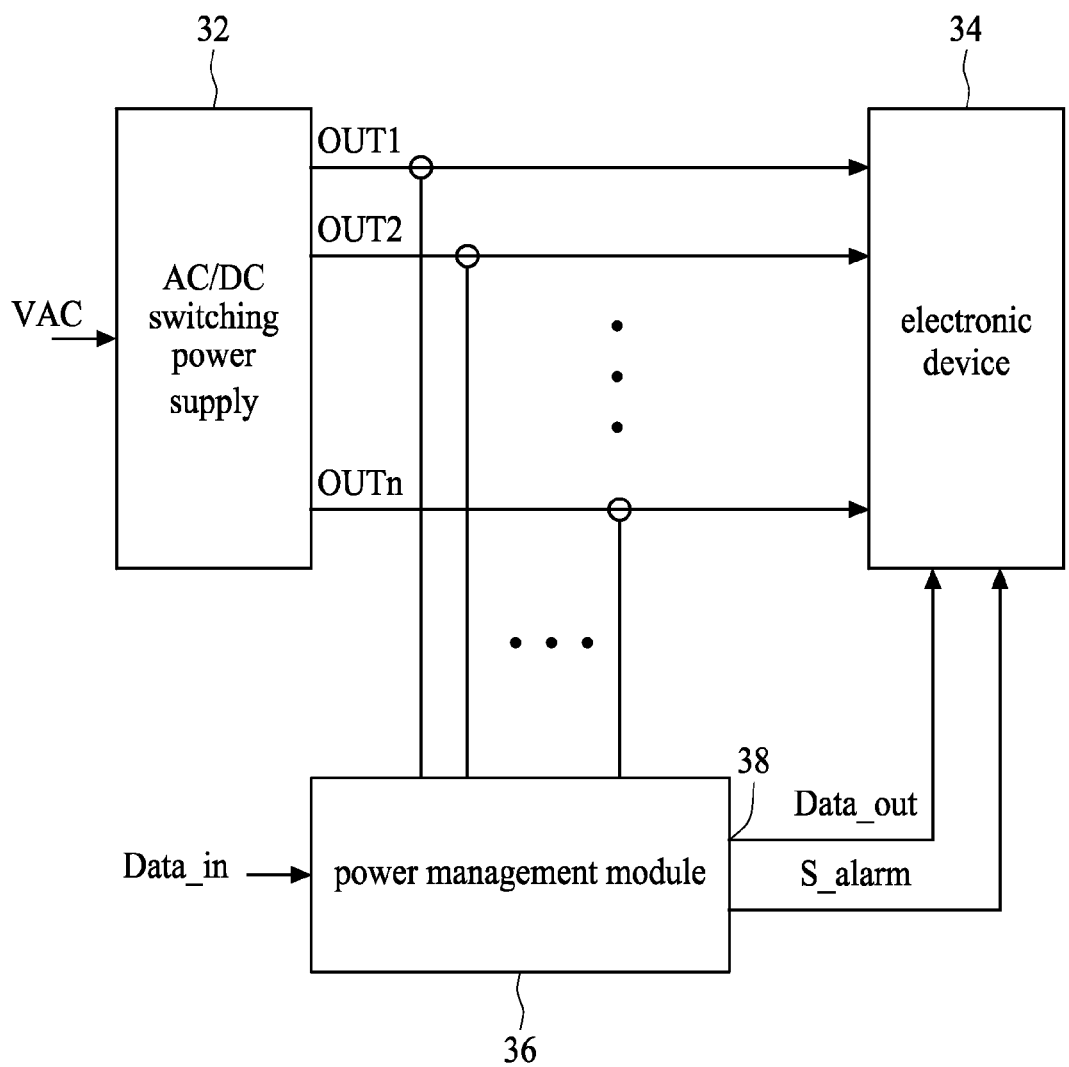
FIG. 3 is a block diagram of an electronic system in accordance with one embodiment of the invention.

FIG. 3 is a block diagram of an electronic system 30 in accordance with one embodiment of the invention. The electronic system 30 comprises an AC/DC switching power supply 32, an electronic device 34, and a power management module 36 electrically connected between the AC/DC switching power supply 32 and the electronic device 34. In an embodiment, the electronic system 30 is implemented as a personal computer (for example, desktop computer, laptop computer, tablet PC or other suitable computing device), a PDA, wireless communication device (for example, cellular telephone, embedded controller, other suitable device or a combination thereof). In certain embodiments, the AC/DC switching power supply 32 may be an Advanced Technology Extension (ATX) power supply, a Balanced Technology Extension (BTX) power supply, an adaptor, or the like.

Figure 4:
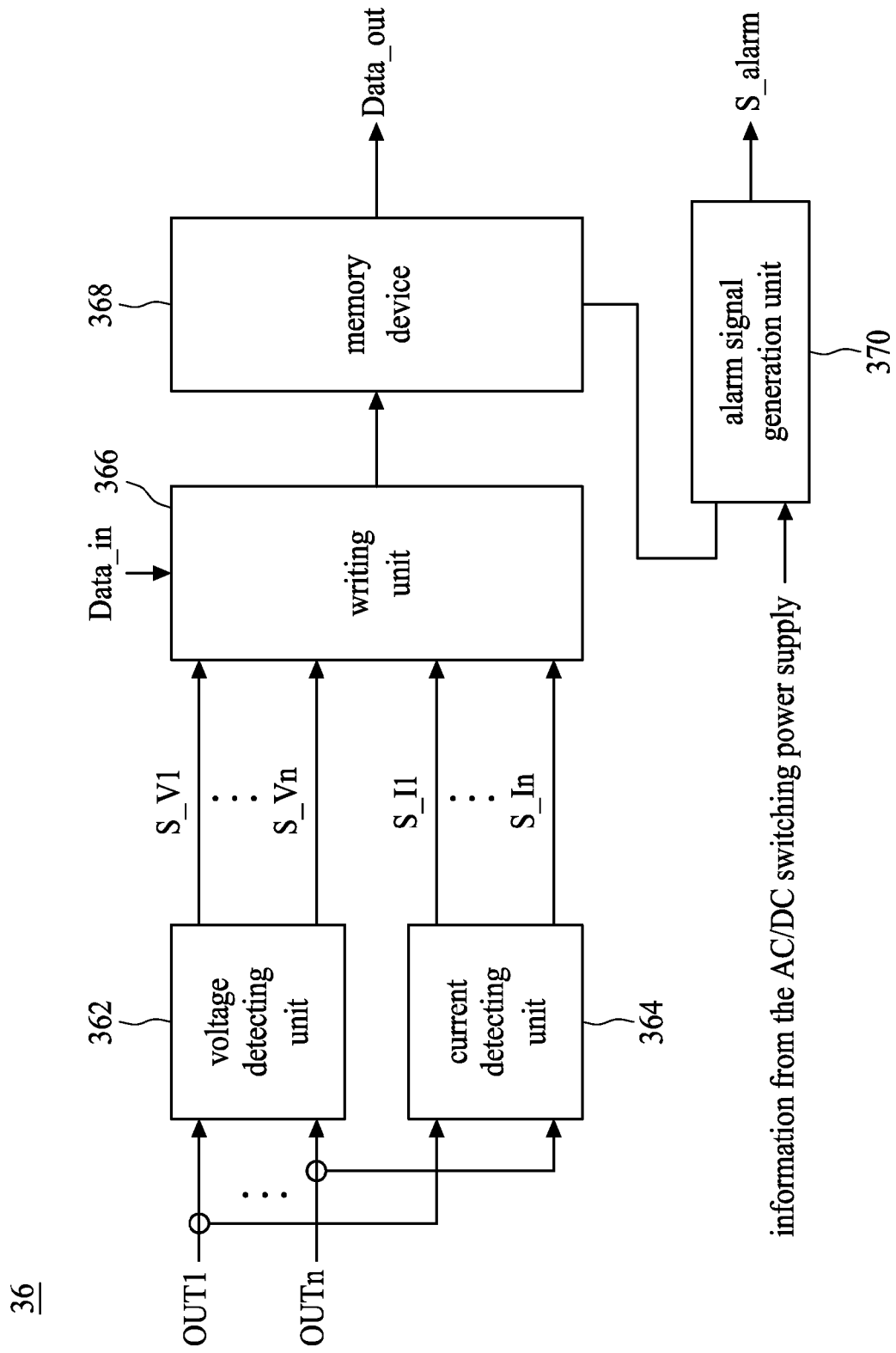
FIG. 4 is a block diagram of a power management module in accordance with one embodiment of the invention.

The power management module 36 is designed to provide information associated with the AC/DC switching power supply 32 and the electronic device 34 so that the electronic device 34 can use the power provided by the switching power supply 32 more efficiently. FIG. 4 is a block diagram of the power management module 36 in accordance with one embodiment of the invention. The power management module 36 comprises a voltage detecting unit 362, a current detecting unit 364, a writing unit 366, and a memory device 368. Referring to FIG. 4, the voltage detecting unit 362 detects voltage values of a plurality of output terminals OUT1 to OUTn of the switching power supply 32 for generating a plurality of voltage signals S_V1 to S_Vn to the writing unit 366. The current detecting unit 364 detects current values of the plurality of output terminals OUT1 to OUTn of the switching power supply 32 for generating a plurality of current signals S_I1 to S_In to the writing unit 366. The writing unit 366 receives an input data DATA_in, the voltage signals S_V1 to S_Vn, and the current signals S_I1 to S_In, and writes the input data DATA_in and the voltage and the current signals to the memory device 368. The memory device 368 generates an output data DATA_out to the electronic device 34 according to the write-in data.

Figure 5:
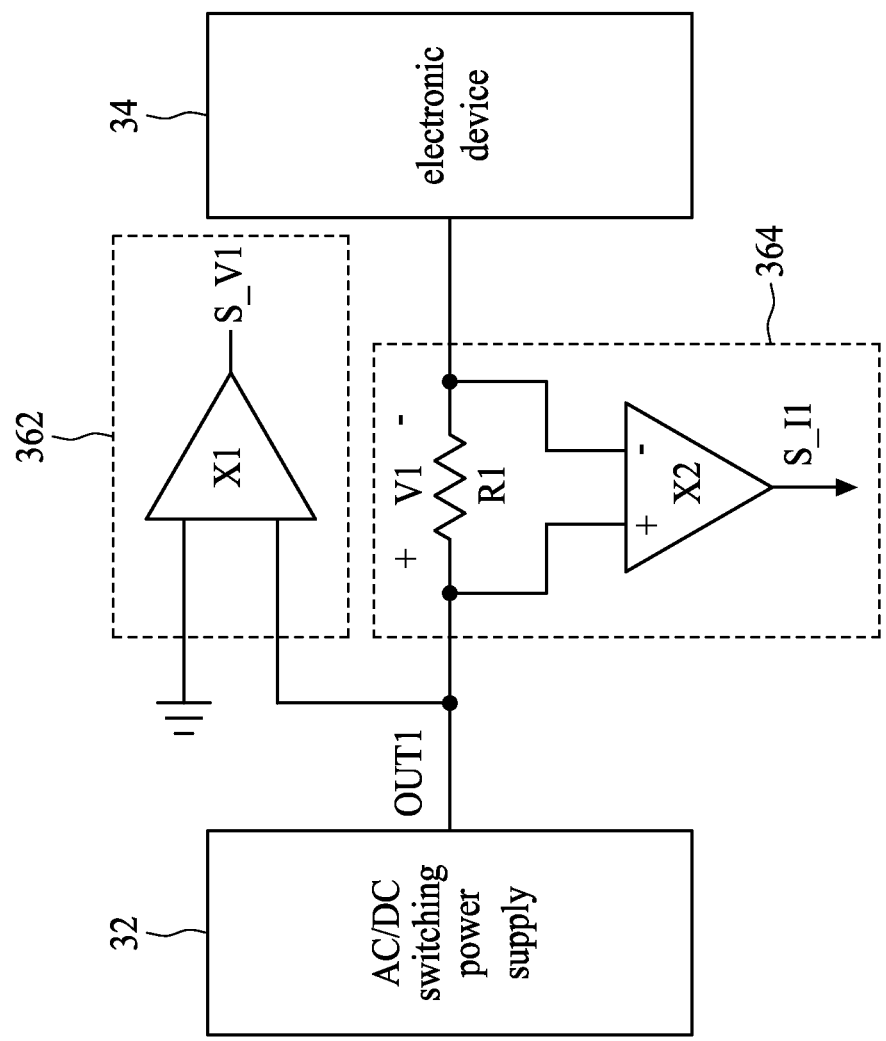
FIG. 5 is a schematic diagram of a voltage detecting unit and a current detecting unit in accordance with one embodiment of the invention.

The following describes the details of the operation of the power management module 36 of the present invention. For the purpose of concision, the switching power supply 32 is illustrated with two output terminals OUT1 and OUT2. During operation, the voltage detecting unit 362 and the current detecting unit 364 continuously detect the output voltages and currents of the output terminals OUT1 and OUT2 of the switching power supply 32, and then output voltage signals S_V1, S_V2 and current signals S_I1, S_I2 to the writing unit 366. The output voltage signals S_V1 and S_V2 represent the actual output voltage values of the terminals OUT1 and OUT2, while the output current signals S_I1 and S_I2 represent the actual output current values of the terminals OUT1 and OUT2. In one embodiment of the present invention, the voltage detecting unit 362 is implemented as an instrumentation amplifier as shown in FIG. 5. The instrumentation amplifier has a high common-mode rejection ratio (CMRR) and thus is suitable for measuring voltage values. In one embodiment of the present invention, the current detecting unit 364 comprises a precise resistor R1 and a transconductance amplifier X2 as shown in FIG. 5. The resistor R1 is disposed on the current path of the output terminal OUT1, and the transconductance amplifier X2 measures the voltage V1 across the resistor R1 to generate the current signal S_I1. However, it should be obvious that the present invention is not limited to this configuration.

Referring to FIG. 4, the writing unit 366 receives and writes the voltage signals and the current signals to the memory device 368. The memory device 368 may be, but is not limited to, RAM, ROM, flash RAM, programmable ROM (PROM), erasable PROM (EPROM), and electrically erasable PROM (EEPROM). In a preferred embodiment, the memory device is an EEPROM device. EEPROM devices are currently used in numerous applications because the EEPROM can be electrically erased and reprogrammed repeatedly.

Referring to FIG. 4, the writing unit 366 further receives the input data DATA_in. The input data DATA_in comprises, but is not limited to, associated manufactured data and associated rated data. The associated manufactured data can be the name of the company that manufactured the switching power supply 32 or the date on which the switching power supply 32 was manufactured, and the associated rated data can be the rated total output power, the rated voltage and current values provided by the output terminals OUT1 and OUT2. After receiving the input data DATA_in and output signals from the voltage detecting unit 362 and the current detecting unit 364, the writing unit 366 writes the data into a data field storage area, which stores a plurality of data fields. FIG. 6 illustrates data format of the data fields in accordance with one embodiment of the invention. Referring to FIG. 6, the data fields indicate associated information of the switching power supply 32. For example, the first data field shows "XXX" which indicates the name of the company that manufactured the switching power supply 32, the second data field shows "240 W" which indicates the rated total output power, the third data field shows "12V" which indicates the rated voltage value provided by the output terminal OUT1, the fourth data field shows "5 A" which indicates the rated current value provided by the output terminal OUT1, the fifth data field shows "5V" which indicates the rated voltage value provided by the output terminal OUT2, the sixth data field shows "3 A" which indicates the rated current value provided by the output terminal OUT2, the seventh data field shows "12.2V" which indicates the actual voltage values of the output terminal OUT1, and the eighth data field shows "4 A" which indicates the actual current value of the output terminal OUT1.

The memory device 368 sends the data stored in the data fields to the electronic device 34 in a constant time interval. In one embodiment of the present invention, the power management module 36 comprises a connecting port 38 as shown in FIG. 3, and the memory device 368 sends the data DATA_out to the electronic device 34 via the connecting port 38. The connecting port 38 can be implemented as a serial port, which is compatible with RS232, RS242, I²C compatible communications protocol, USB, and IEEE 1394 port. The electronic device 34 can obtain the rated supply information and the actual output information of the switching power supply 32 via the connecting port 38.

Figure 7:
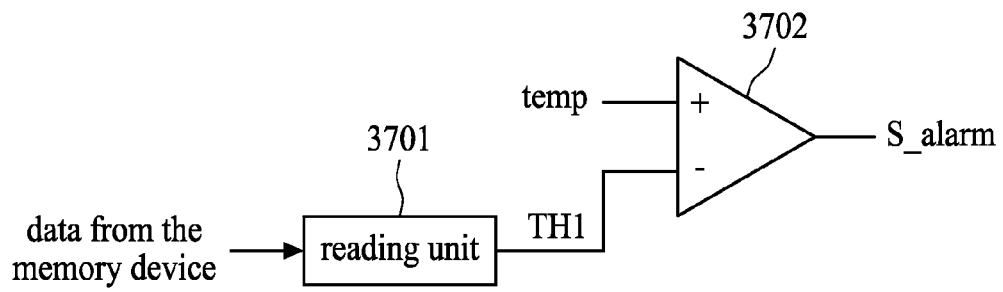
FIG. 7 is a block diagram of an alarm signal generation unit in accordance with one embodiment of the invention.

In addition, the power management module 36 further comprises an alarm signal generation unit 370 to provide an alarm signal to the electronic device 34 as shown in FIG. 4. The alarm signal generation unit 370 generates an alarm signal S_alarm according to the data stored in the memory device 368 and the operation condition of the switching power supply 32. FIG. 7 is a block diagram of the alarm signal generation unit 370 in accordance with one embodiment of the invention. The alarm signal generation unit 370 comprises a reading unit 3701 and a comparison unit 3702. Referring to FIG. 7, the reading unit 3701 reads a preset highest temperature threshold value TH1 from the memory device 368, wherein the threshold value TH1 is a portion of the input data DATA_in, and is written to the eleventh data field shown in FIG. 6 by the writing unit 366. After receiving the threshold values TH1 and a temperature signal temp from the switching power supply 32, the comparison unit 3702 compares these two signals and generates the alarm signal S_alarm. In this embodiment, when the temperature of the switching power supply 32 is higher than the preset highest temperature threshold value "125 degrees," the alarm signal S_alarm transitions from logic low level to logic high level so as to alert the electronic device 34.

Figure 8:
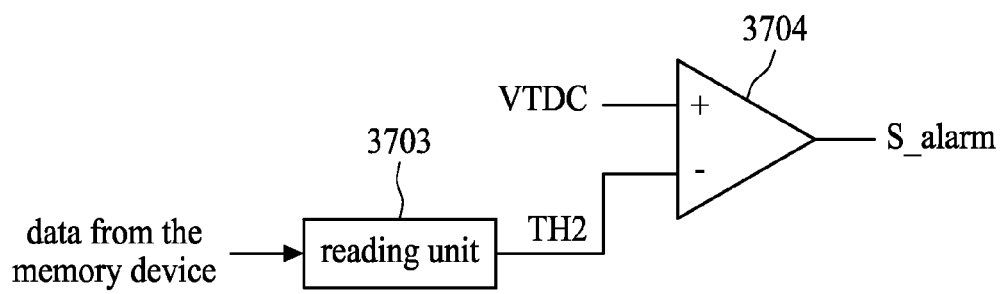
FIG. 8 is a block diagram of an alarm signal generation unit in accordance with one embodiment of the invention.

FIG. 8 is a block diagram of the alarm signal generation unit 370' in accordance with one embodiment of the invention. The alarm signal generation unit 370' comprises a reading unit 3703 and a comparison unit 3704. Referring to FIG. 8, the reading unit 3703 reads a preset lowest temperature threshold value TH2 from the memory device 368, wherein the threshold value TH2 is a portion of the input data DATA_in, and is written to the twelfth data field shown in FIG. 6 by the writing unit 366. After receiving the threshold values TH2 and a voltage signal VTDC from the switching power supply 32, the comparison unit 3704 compares these two signals and generates the alarm signal S_alarm.

Figure 9:
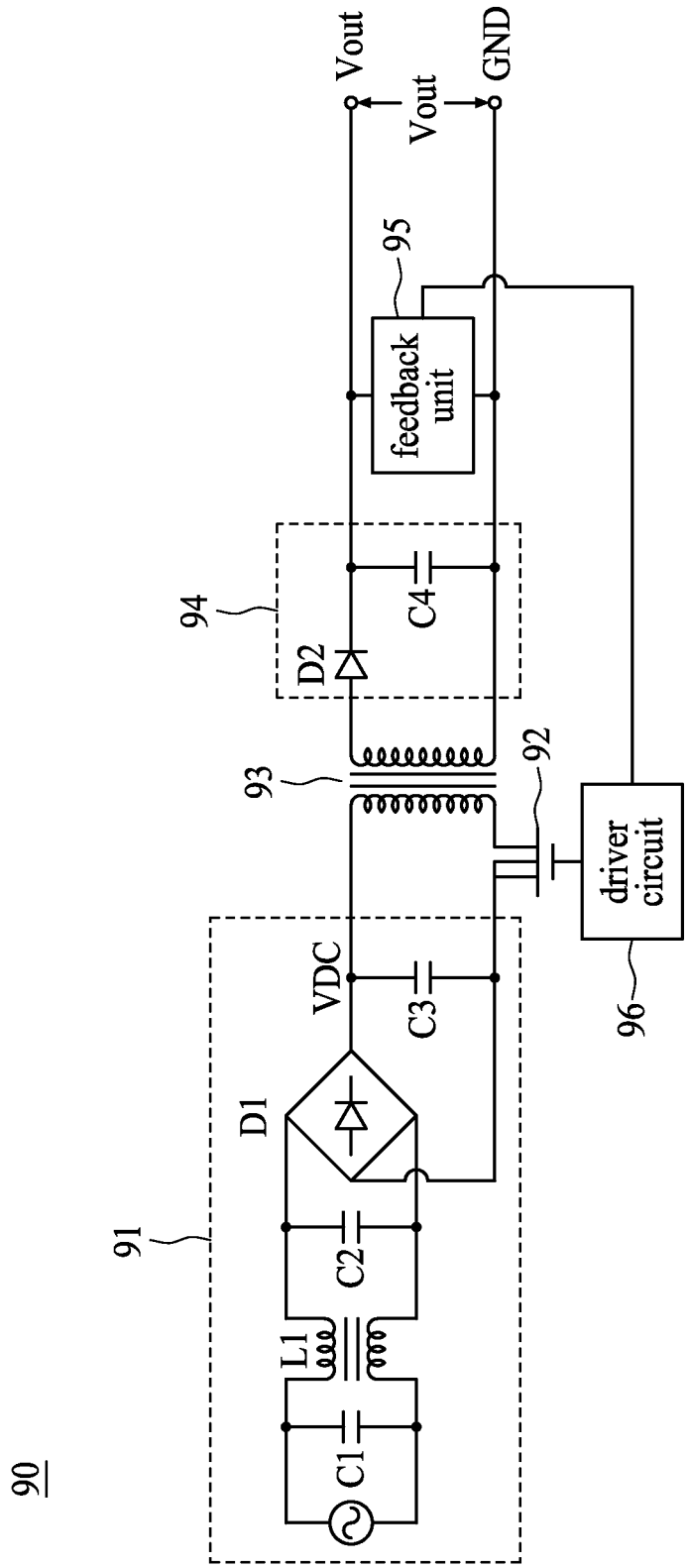
FIG. 9 is a circuit diagram of a conventional switching power supply.

The voltage signal VTDC represents a peak voltage value of the AC power supplied to the switching power supply 32. FIG. 9 is a circuit diagram of a conventional switching power supply 90. The conventional switching power supply 90 comprises an input unit 91, a power transistor 92, a transformer 93, an output unit 94, a feedback unit 95, and a driver circuit 96. Referring to FIG. 9, the input unit 91 converts the AC power supply into a DC voltage VDC through an LC filter (composed of capacitors C1, C2 and an inductance L1), a bridge diode D1, and a smoothing capacitor C3. Therefore, the voltage signal VTDC represents the peak voltage value of the AC power supplied to the switching power supply 90.

In a similar way, the switching power supply 32 can generate the voltage signal VTDC to the comparison unit 3704. In this embodiment, when the peak voltage value of the AC power supplied to the switching power supply 32 is lower than the preset lowest AC power supply of 90V, the alarm signal S_alarm transitions form logic low level to logic high level so as to alert the electronic device 34.

Figure 10:
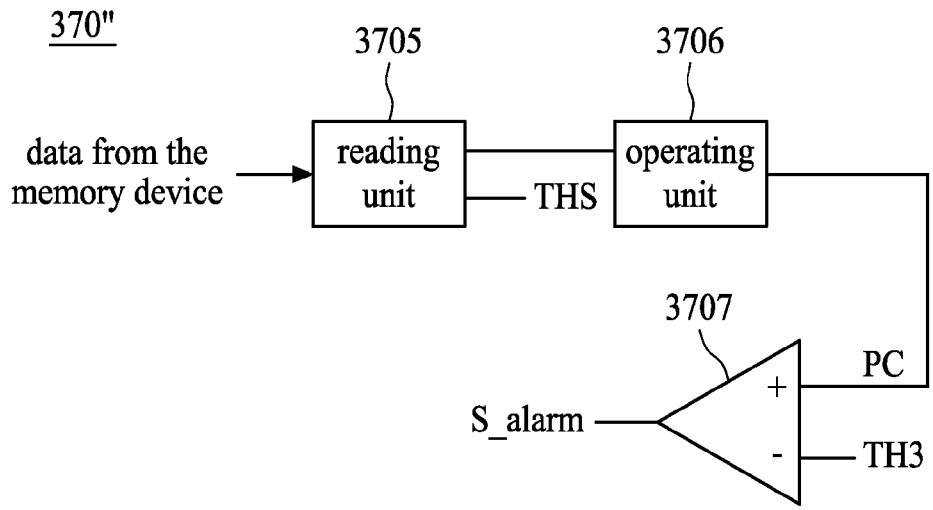
FIG. 10 is a block diagram of an alarm signal generation unit in accordance with one embodiment of the invention.

FIG. 10 is a block diagram of the alarm signal generation unit 370'' in accordance with one embodiment of the invention. The alarm signal generation unit 370'' comprises a reading unit 3705, an operating unit 3706, and a comparison unit 3707. Referring to FIG. 10, the reading unit 3705 reads actual output voltage and current information of the output terminal OUT1, actual output voltage and current information of the output terminal OUT2, and a preset highest power threshold value TH3 from the memory device 368 in sequence, wherein the threshold value TH3 is a portion of the input data DATA_in, and is written to the thirteenth data field shown in FIG. 6 by the writing unit 366. The operating unit 3706 calculates a current total output power value PC according to the actual output voltage and current values of the output terminals OUT1 and OUT2. After receiving the threshold value TH3 and the power value PC, the comparison unit 3706 compares these two signals and generates the alarm signal S_alarm. In this embodiment, when the current total output power value PC is higher than the preset highest power threshold value of 230 W, the alarm signal S_alarm transitions form logic low level to logic high level so as to alert the electronic device 34.

Figure 11:
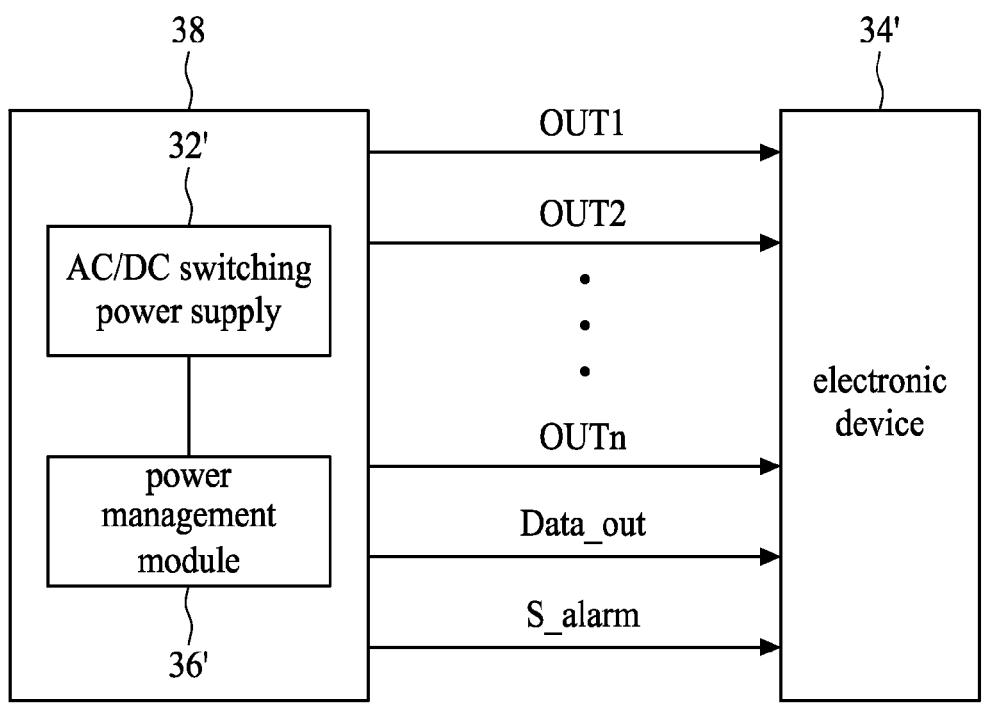
FIG. 11 is a block diagram of an electronic system in accordance with another embodiment of the invention.

Referring to FIG. 3, the switching power supply 32 and the power management module 36 are two separate apparatuses in one embodiment of the present invention. However, in another embodiment of the present invention, the switching power supply 32 and the power management module 36 can be integrated together in a single apparatus to make using the system more efficient and reduce the total space. FIG. 11 is a block diagram of the electronic system 30' in accordance with another embodiment of the invention. The electronic system 30' is composed of a power management apparatus 38 and an electronic device 34'. The power management apparatus 38 is composed of an AC/DC switching power supply 32', whose configuration is similar to that of the switching power supply 32, and a power management module 36', whose configuration is similar to that of the power management module 36. The operation of the switching power apparatus 38 is the same as mentioned above, and thus the detail of the operation is omitted herein.

Figure 12:
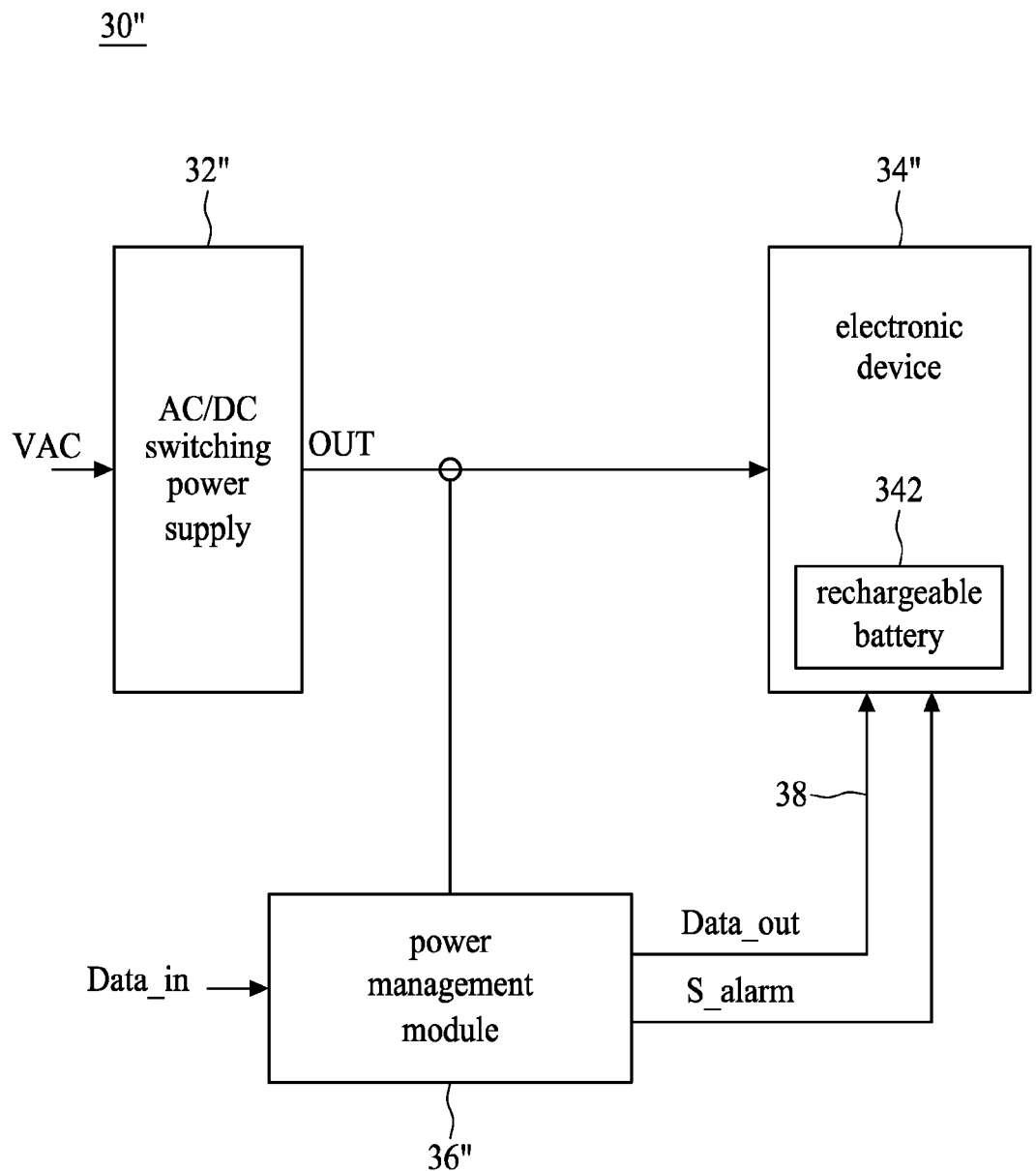
FIG. 12 is a block diagram of an electronic system in accordance with one embodiment of the invention.

When the electronic device 34 is a portable device, such as a laptop computer, a PDA, or a cell phone, the electronic device 34 is usually powered by a battery. The battery may be a rechargeable battery of a variety of types such as nickel cadmium (NiCd), nickel-metal hydride (NiMH), lithium ion (Li-ion) and lithium-polymer (Li-polymer). To manage the charge current of the rechargeable battery more efficiently, the power management modules 36 and 36' can further comprise a battery management unit to manage the charge current of the rechargeable battery. FIG. 12 is a block diagram of an electronic system 30" in accordance with one embodiment of the invention. Referring to FIG. 12, the electronic system 30" comprises an AC/DC switching power supply 32", an electronic device 34", and a power management module 36" electrically connected between the AC/DC switching power supply 32" and the electronic device 34". The switching power supply 32" has an output terminal OUT to provide power to the electronic device 34", and the electronic device 34" comprises a rechargeable battery 342.

Figure 13:
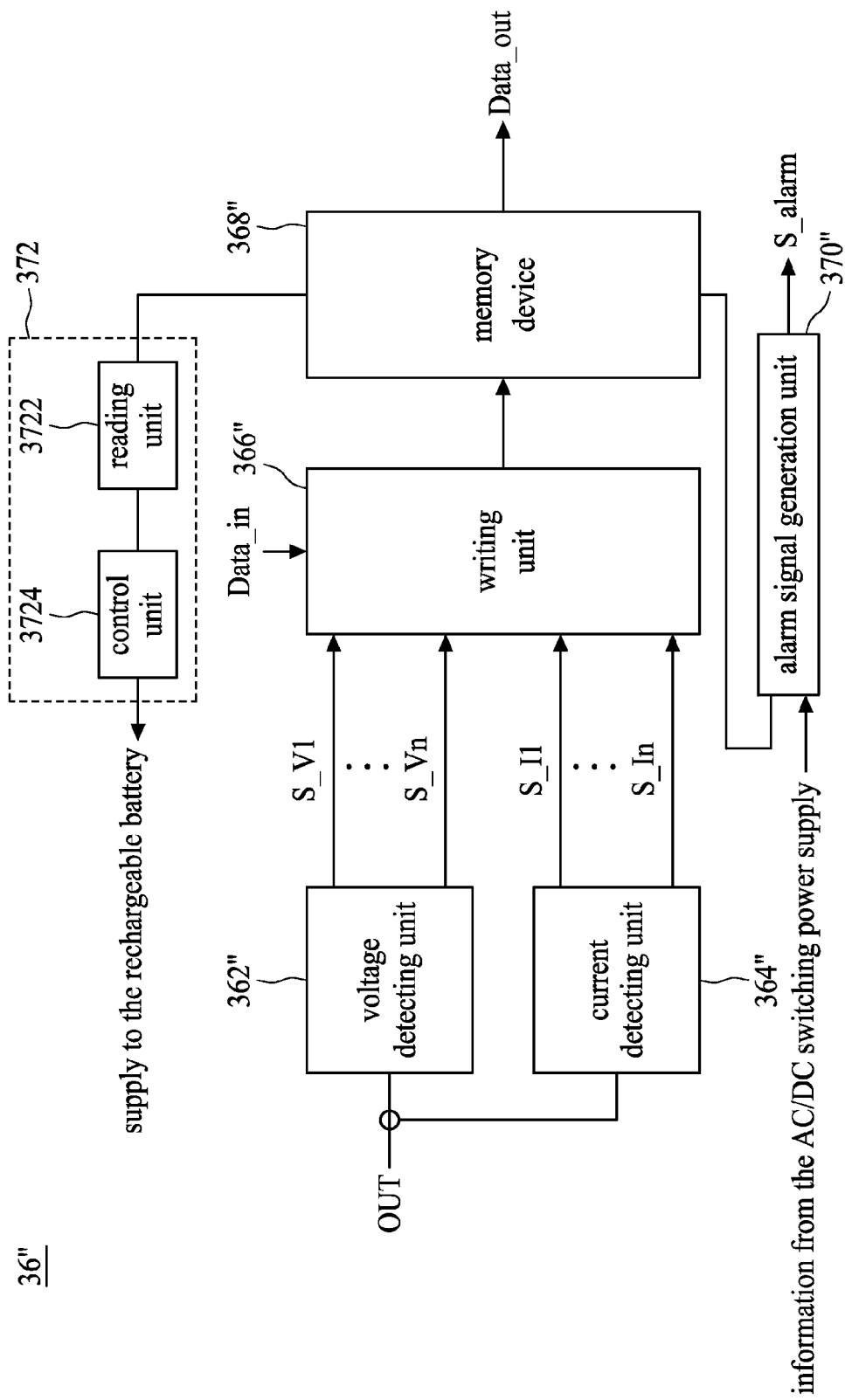
FIG. 13 is a block diagram of a power management module in accordance with one embodiment of the invention.

FIG. 13 is a block diagram of the power management module 36" in accordance with one embodiment of the invention. The power management module 36" comprises a voltage detecting unit 362", a current detecting unit 364", a writing unit 366", a memory device 368", an alarm signal generation unit 370", and a battery management unit 372, wherein the like elements of FIG. 4 are shown having like reference designations.

Referring to FIG. 13, the battery management unit 372 controls the charge current of the rechargeable battery 342 in the electronic device 34 according the rated current value and the actual current value of the switching power supply 32". During operation, the battery management unit 372 comprises a reading unit 3722 to read the rated current value and the actual current value of the output terminal OUT from the memory device 368. The battery management unit 372 further comprises a control unit 3724 to control the charge current of the rechargeable battery 342 according to the difference between the rated current value and the actual current value. In this manner, the battery management unit 372 can adjust the charge current of the rechargeable battery 342 dynamically according to the variance of the load of the electronic device 34". In addition, if the electronic device 34" enters a standby mode, devices in the electronic device 34" will stop operation. In this case, the battery management unit 372 provides the rated current value from the output terminal OUT of the switching power supply 32" to the rechargeable battery 342 of the electronic device 34" so that the rechargeable battery 342 can be charged rapidly.

The system in accordance with the present invention can take the form of a hardware-only implementation, a software-only implementation, or an implementation containing both hardware and software. Furthermore, the unit or module can be implemented in the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or devices.

The above-described embodiments of the present invention are intended to be illustrative only. Numerous alternative embodiments may be devised by persons skilled in the art without departing from the scope of the following claims.

What is claimed is:

1. A power management module, which is electrically connected between an alternating current (AC)/direct current (DC) switching power supply and an electronic device, the power management module comprising:
   a memory device for generating an output data to the electronic device;
   a voltage detecting unit for detecting a voltage value of at least one output terminal of the AC/DC switching power supply and generating at least one voltage signal;
   a current detecting unit for detecting a current value of the at least one output terminal of the AC/DC switching power supply and generating at least one current signal;
   a writing unit for receiving an input data, the voltage signal from the voltage detecting unit, and the current signal from the current detecting unit, and for writing the input data, the voltage signal, and the current signal to the memory device; and
   an alarm signal generation unit for providing an alarm signal to the electronic device according to the data in the memory device written by the writing unit and according to the operation condition of the AC/DC switching power supply,
   wherein the input data comprises a preset temperature threshold value, and the alarm signal generation unit comprises:
      a reading unit for reading the preset temperature threshold value from the memory device and sending the preset temperature threshold value to a comparison unit; and
      the comparison unit for receiving the preset temperature threshold value and a temperature signal from the AC/DC switching power supply, and for comparing these two signals to generate the alarm signal,
   wherein the memory device sends the output data to the electronic device via an external port on the electronic device, wherein the electronic device uses the output data to adjust a charge current of a rechargeable battery within the electronic device, and wherein the power management module is a separate physical machine than the electronic device.

2. The power management module of claim 1, wherein the input data is associated manufactured data of the AC/DC switching power supply.

3. The power management module of claim 1, wherein the input data is associated rated data of the AC/DC switching power supply.

4. The power management module of claim 1, wherein the input data comprises a preset input voltage threshold value, and the alarm signal generation unit comprises:
   a reading unit for reading a preset input voltage threshold value from the memory device and sending the preset input voltage threshold value to a comparison unit; and
   the comparison unit for receiving the preset input voltage threshold value and a voltage signal indicating the peak voltage value of an AC power supplied to the AC/DC switching power supply, and for comparing these two values to generate the alarm signal.

5. The power management module of claim 1, wherein the input data comprises a preset output power threshold value, and the alarm signal generation unit comprises:
   a reading unit for reading the preset output power threshold value from the memory device, the at least one voltage signal from the voltage detecting unit, and the at least one current signal from the current detecting unit, and for sending the reading data to an operating unit and a comparison unit;
   the operating unit for calculating a current total output power value according to the at least one voltage signal and the at least one current signal; and
   the comparison unit for receiving the preset output power threshold value and the current total output power value, and comparing these two values to generate the alarm signal.

6. The power management module of claim 1, wherein the input data comprises a rated current value of the at least one output terminal of the AC/DC switching power supply, and the power management module further comprises a battery management unit, the battery management unit comprising:
   a reading unit for reading the rated current value from the memory device and the at least one current signal from the current detecting unit, and for outputting the reading data to a control unit; and
   the control unit for controlling a charge current of a rechargeable battery in the electronic device according to the rated current value and the at least one current signal.

7. The power management module of claim 1, further comprising a battery management unit, wherein if the electronic device operates in a standby mode, the battery management unit provides the rated current value of the at least one output terminal of the switching power supply to an rechargeable battery in the electronic device.

8. The power management module of claim 1, wherein the port is a serial connecting port.

9. The power management module of claim 1, wherein the memory device sends the output data to the electronic device over a cable plugged into said external port on the electronic device.

10. A power supply apparatus for providing power to an electronic device, the power supply apparatus comprising:
   an alternating current (AC)/direct current (DC) switching power supply; and
   a power management module electrically connected to the AC/DC switching power supply, the power management module comprising:
      a memory device for generating an output data to the electronic device;
      a voltage detecting unit for detecting a voltage value of at least one output terminal of the switching power supply and generating at least one voltage signal;
      a current detecting unit for detecting a current value of the at least one output terminal of the switching power supply and generating at least one current signal;
      a writing unit for receiving an input data, the voltage signal from the voltage detecting unit, and the current signal from the current detecting unit, and for writing the input data, the voltage signal, and the current signal to the memory device; and
      an alarm signal generation unit for providing an alarm signal to the electronic device according to the data in the memory device written by the writing unit and according to the operation condition of the AC/DC switching power supply,
   wherein the input data comprises a preset temperature threshold value, and the alarm signal generation unit comprises:
   a reading unit for reading the preset temperature threshold value from the memory device and for sending the preset temperature threshold value to a comparison unit; and
   the comparison unit for receiving the preset temperature threshold value and a temperature signal from the AC/DC switching power supply, and for comparing these two signals to generate the alarm signal,
   wherein the memory device sends the output data to the electronic device via an external port on the electronic device, wherein the electronic device uses the output data to adjust a charge current of a rechargeable battery within the electronic device, and wherein the power management module is a separate physical machine than the electronic device.

11. The power supply apparatus of claim 10, wherein the input data is associated manufactured data of the AC/DC switching power supply.

12. The power supply apparatus of claim 10, wherein the input data is associated rated data of the AC/DC switching power supply.

13. The power supply apparatus of claim 10, wherein the input data comprises a preset input voltage threshold value, and the alarm signal generation unit comprises:
   a reading unit for reading the preset input voltage threshold value from the memory device and sending the preset input voltage threshold value to a comparison unit; and
   the comparison unit for receiving the preset input voltage threshold value and a voltage signal indicating the peak voltage value of an AC power supplied to the AC/DC switching power supply, and for comparing these two signals to generate the alarm signal.

14. The power supply apparatus of claim 10, wherein the input data comprises a preset output power threshold value, and the alarm signal generation unit comprises:
   a reading unit for reading the preset output power threshold value from the memory device, the at least one voltage signal from the voltage detecting unit, and the at least one current signal from the current detecting unit, and for sending the reading data to an operating unit and a comparison unit;
   the operating unit for calculating a current total output power value according to the at least one voltage signal and the at least one current signal; and
   the comparison unit for receiving the preset output power threshold value and the current total output power value, and comparing these two signals to generate the alarm signal.

15. The power supply apparatus of claim 10, wherein the input data comprises a rated current value of the at least one output terminal of the AC/DC switching power supply, and the power management module further comprises a battery management unit, the battery management unit comprising:
   a reading unit for reading the rated current value from the memory device and the at least one current signal from the current detecting unit, and outputting the reading data to a control unit; and
   the control unit for controlling a charge current of a rechargeable battery in the electronic device according to the rated current value and the at least one current signal.

16. The power supply apparatus of claim 10, further comprising a battery management unit, wherein if the electronic device operates in a standby mode, the battery management unit provides the rated current value of the at least one output terminal of the switching power supply to a rechargeable battery in the electronic device.

17. The power supply apparatus of claim 10, wherein the port is a serial connecting port.

18. The power supply apparatus of claim 10, wherein the memory device sends the output data to the electronic device over a cable plugged into said external port on the electronic device.

* * * * *

UNITED STATES PATENT AND TRADEMARK OFFICE
CERTIFICATE OF CORRECTION

| | | |
|---|---|---|
| PATENT NO. | : 8,972,210 B2 | Page 1 of 1 |
| APPLICATION NO. | : 13/026626 | |
| DATED | : March 3, 2015 | |
| INVENTOR(S) | : Abel Yang | |

It is certified that error appears in the above-identified patent and that said Letters Patent is hereby corrected as shown below:

In the Claims:

Claim 7, column 9, line 18, replace "an" with --a--.

Signed and Sealed this
Twenty-third Day of June, 2015

Michelle K. Lee
*Director of the United States Patent and Trademark Office*